United States Patent [19]

Larson

[11] 4,017,329
[45] Apr. 12, 1977

[54] METHOD OF RESTORING HYDRAULIC SYSTEMS

[76] Inventor: Philip C. Larson, 23908 Canerwell, Newhall, Calif. 91321

[22] Filed: Jan. 7, 1976

[21] Appl. No.: 647,287

[52] U.S. Cl. .............................. 134/21; 134/22 R; 134/24; 134/40; 137/15; 188/352
[51] Int. Cl.² ...................... B08B 7/04; B08B 9/06
[58] Field of Search ................ 134/21, 22 R, 22 C, 134/24, 40; 137/15; 188/352

[56] References Cited

UNITED STATES PATENTS

| | | | |
|---|---|---|---|
| 1,825,013 | 9/1931 | Patton | 134/22 R X |
| 2,295,539 | 9/1942 | Beach | 188/352 |
| 2,348,465 | 5/1944 | Geiringer | 134/21 UX |
| 3,154,087 | 10/1964 | Beaver | 137/15 |

Primary Examiner—S. Leon Bashore
Assistant Examiner—Richard V. Fisher

[57] ABSTRACT

A method of cleaning and replenishing vehicle hydraulic brake systems is provided which includes opening all of the bleeder screws at the outlet end of the brake system and allowing the old brake fluid to flow from the brake system. Liquid solvent dichlorodifluromethane is then injected into the brake system under pressure at the master cylinder and allowed to flow through the system and out the bleeder screws. As the solvent enters the brake system, it wil mix with any remaining brake fluid and water in the system and, upon vaporization, will remove the remaining brake fluid and water from the system. When the solvent is observed flowing out of the bleeder screws, the solvent is shut off at the master cylinder and the bleeder screws are closed. A vacuum is then applied to the brake system at the master cylinder to vaporize and remove any solvent trapped in the system and to remove all air from the system. While the vacuum is maintained, new brake fluid is injected under pressure into the brake system through the master cylinder until the brake system is filled with new brake fluid. The connection to the master cylinder is then removed and the hydraulic brake system is closed.

4 Claims, 1 Drawing Figure

METHOD OF RESTORING HYDRAULIC SYSTEMS

BACKGROUND OF THE INVENTION

This invention relates to a method of restoring hydraulic systems, and more particularly to a method of cleaning and replenishing a vehicle hydraulic brake system.

Vehicle brake systems often contain slight amounts of air trapped with the brake fluid. This may be due either to improper filling of the system with brake fluid at the vehicle manufacturing facility or at the repair shop when the brake wheel cylinders are being replaced or the like.

It is recognized that vehicle brakes are an important part of the vehicle safety system, and all of the other elements of the brake system, such as brake shoes, seals, caps, and cylinders, are periodically repaired or replaced. However, proper cleansing and replenishing of the hydraulic system has not been possible to date due to the absence of any adequate method. This lack of a properly cleansed and replenished hydraulic brake system nullifies all of the other efforts and costs which go into repairing and replacing the mechanical portions of the brake system. The result of inadequately cleansing and replenishing a hydraulic brake system is the possibility of unexpected brake failure which could lead to serious accidents.

For example, the current practice for cleaning vehicle hydraulic brake systems is to open the bleeder screws at the wheel cylinders and inject new brake fluid into the system through the master cylinder to rid the system of entrapped water and air as the new fluid pushes the old fluid out of the system. The brake fluid must be allowed to run out of the bleeder screws long enough to provide some reasonable probability that the old brake fluid and the entrapped air and water has been removed. Besides being relatively expensive in terms of wasted brake fluid, this method is ineffectual since water and air is typically trapped in the system at bends in the brake lines and the like. Thus, current restoring methods ineffectually employ a large amount of expensive brake fluid while leaving behind some old brake fluid, air and water.

I have discovered a new method for cleansing and replenishing vehicle hydraulic brake systems which insures a perfectly clean system filled with new brake fluid without entrapment of contaminents, such as air and water. In addition, the method of this invention is relatively inexpensive compared to the current method of flushing brake systems with new brake fluid. The method of this invention also reduces the time currently required to flush old brake fluid and contaminents froam the hydraulic brake system.

SUMMARY OF THE INVENTION

A method of cleaning and replenishing a hydraulic system, having first and second ends, is provided which includes draining the hydraulic fluid from the system and injecting an organic solvent into the system through one end of the system. The solvent is miscible with oil and vaporizes at low temperatures and atmospheric pressure. The solvent is vaporized and a vacuum is applied to the system to remove all of the air and solvent vapor from the system. While still maintaining the vacuum on the system, one end of the system is then closed and hydraulic fluid is injected into the open end of the system to fill the system with fluid. The entire system is then closed.

In one embodiment of the invention, the hydraulic system is a hydraulic vehicle brake system, the hydraulic fluid is brake fluid, and the solvent is dichlorodifluoromethane.

BRIEF DESCRIPTION OF THE DRAWINGS

In the drawing which constitutes a part of this specification, an exemplary embodiment demonstrating various features of this invention is set forth wherein.

DESCRIPTION OF THE INVENTION

Figure 1:
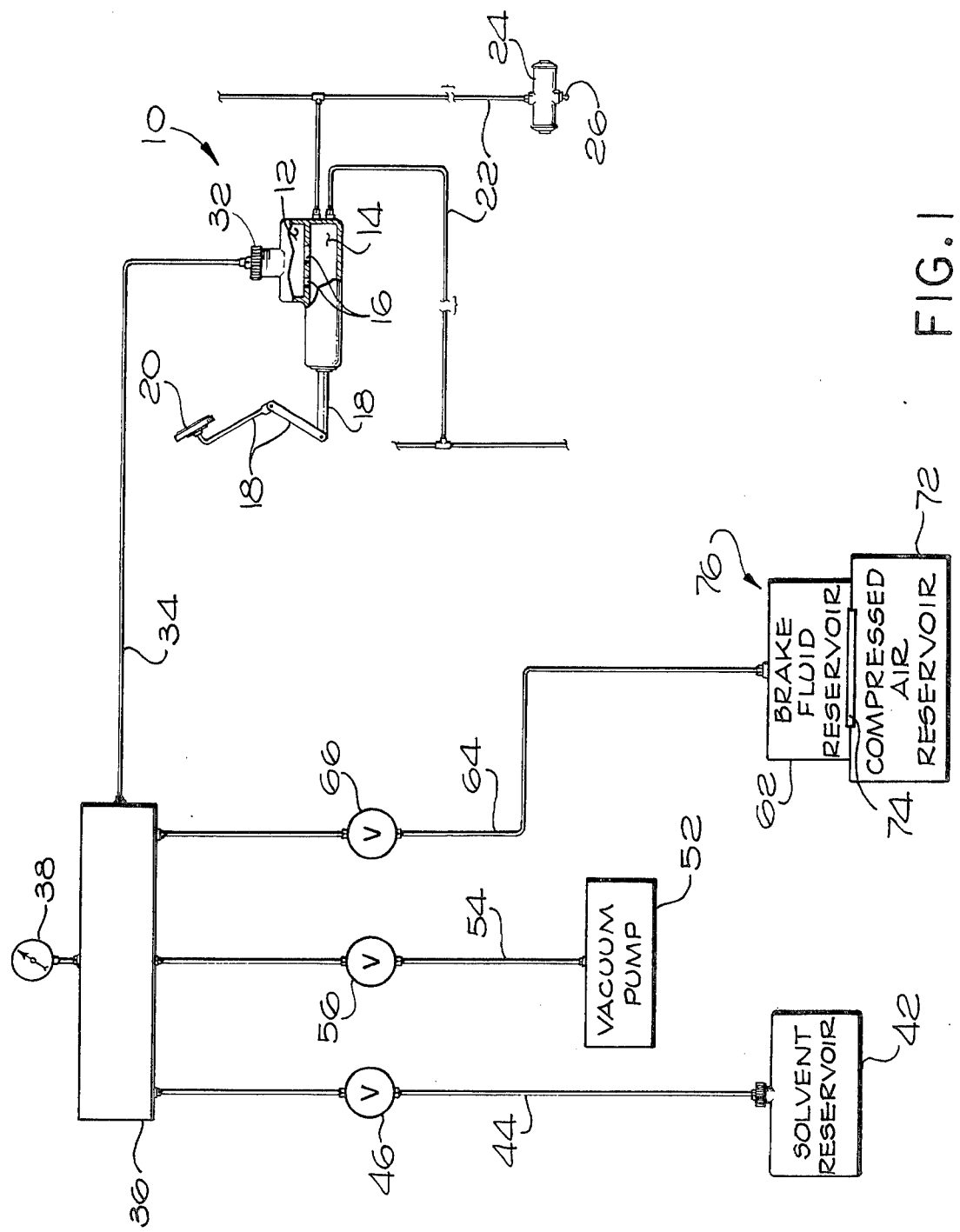
FIG. 1 is a schematic diagram of a system employed in one embodiment of this invention.

In the embodiment of the invention shown in FIG. 1, wheel bleeder screws 26 of a vehicle hydraulic brake system 10 are opened to allow the old brake fluid to flow from the brake system. A manifold 36 is connected to the brake system master cylinder 14. Solvent under pressure is then passed through the manifold 36 into the master cylinder 14 where it flows through the brake system and out the bleeder screws. When the solvent is visible at all of the bleeder screws, the solvent is shut off and the bleeder screws are closed. A vacuum is then applied to the brake system through the manifold 36 and the master cylinder 14 to withdraw all of the air and the vaporized solvent from the brake system. A valve 56 connecting vacuum pump 52 to the brake system 10 is then closed and new brake fluid under pressure is supplied through the manifold and master cylinder to the brake system to fill the brake system with new brake fluid. The manifold is then disconnected from the master cylinder and the master cylinder is closed.

More specifically, the brake system 10 shown in FIG. 1 includes an oil reservoir 12 and a master cylinder 14 connected by a filler and compensating parts 16 which allow brake fluid to pass between the reservoir and the master cylinder. The master cylinder 14 is operated by means of linkage 18 connecting the brake foot pedal 20 to a master cylinder piston (not shown).

Brake lines 22 conduct fluid from the master cylinder 14 to the individual brake wheel cylinders 24. All but one of the wheel cylinders 24 and all of the mechanical portion of the individual brakes have been omitted for clarity. A bleeder screw 26 permits drainage of brake fluid from the wheel cylinder 24.

A discharge hose 34 connects a manifold 36 to a conventional adapter lid 32 secured to the oil reservoir 12 by means not shown. The manifold 36 is a rectangular hollow steel enclosure having various connections which will be explained hereinafter. The discharge hose 34 is a rubber pressure hose having sufficient strength to sustain both the pressure and the vacuum, which will be described hereinafter, without distortion.

A compound gauge 38 threads into the interior of the manifold 36 to indicate the pressure or vacuum within the manifold. Similarly, a conduit 44 connects a solvent reservoir 42 through a valve 46 to the interior of the manifold 36. The solvent in the reservoir 42 is especially adapted to clean vehicle hydraulic brake systems. In this embodiment of the invention, the solvent employed is dichlorodifluromethane which has a boiling point of approximately minus 22.7° F at atmospheric pressure. This solvent is miscible with oil and water and is supplied in liquid form in metal bottle reservoirs under a pressure of about 70 PSI at 70° F. Dichlorodifluromethane solvent is employed since it is non-poisonous, non-explosive, non-corrosive, non-flamable, non-toxic, miscible with oil and water, and vaporizes at room temperature and atmospheric pressure.

Vacuum pump 52 is connected by conduit 54 through valve 56 to the interior of the manifold 36. The vacuum pump 52 is capable of applying a vacuum to the manifold of 20 inches of mercury or more.

A brake fluid reservoir 62 is connected by conduit 64 through valve 66 to the interior of the manifold 36. Each of the valves 46, 56 and 66 may be electrical or mechanical and prohibit flow in either direction when the valve is closed. The brake fluid reservoir is pressurized by compressed air contained in reservoir 72 and separated from the brake fluid in reservoir 62 by a rubber diaphragm 74. The pressure in the compressed air reservoir is maintained at about 10 to 30 PSI so that brake fluid from the reservoir 62 is injected into the manifold 36 when the valve 66 is opened. In this embodiment of the invention, the apparatus 76 including the reservoirs 62 and 72 and the diaphragm 74 is a vehicle brake fluid pressure bleeder.

In operation, the adapter lid 32 is secured to the oil reservoir 12 and the discharge hose 34 is connected between the manifold 36 and the adapter lid 32. The wheel cylinder bleeder screws 26 are open to allow old brake fluid to discharge from the oil reservoir 12, master cylinder 14, brake lines 22, and wheel cylinders 24. When the old brake fluid has been substantially drained, the solvent valve 46 is opened to supply the dichlorodifluromethane through the conduit 44 to the manifold 36 where it is conducted by the discharge hose 34 through the brake system. Since this solvent is supplied to the brake system at about 70 PSI, the constriction of the bleeder screws will normally maintain sufficient pressure within the brake system to maintain some of the solvent in its liquid state at about 70° F. Thus, some of the solvent is a visible liquid when it begins to flow from the bleeder screws 26, although the liquid solvent vaporizes immediately upon flowing from the bleeder screws into the atmosphere. Due to the large degree of expansion of the solvent, only about three ounces of solvent are needed to clean the entire hydraulic brake system of an automobile or the like.

As the dichlorodifluromethane passes through the brake system, it picks up any oil, water, and water vapor remaining within the system and mixes with the oil and water. The oil and water is then either carried with the solvent out of the brake system through the bleeder screws 26 or is later vaporized with the solvent.

When solvent is observed to be flowing from all of the bleeder screws 26, the solvent valve 46 is closed to stop the flow of solvent to the manifold 36 and the bleeder screws are closed to seal off the wheel cylinder ends of the brake system. The vacuum pump 52 is then started and the valve 56 is opened to draw a vacuum on the brake system through the manifold 36 and the discharge line 34. With the bleeder screws 26 closed, a vacuum of about 20 inches of mercury or more is drawn on the brake system to vaporize the remaining solvent and any contaminents the solvent has picked up. In addition, the vacuum removes all air from the brake system. When the vacuum pump has achieved a vacuum of about 20 inches of mercury or more as indicated on the gauge 38, the valve 56 is closed and the vacuum pump 52 is shut off.

With the brake system now evacuated of all air, water, oil, and solvent, the brake fluid valve 66 is opened. New brake fluid is thus supplied by the pressure bleeder 76 through the manifold 36 to the brake system 10. Once the brake system is filled with new brake fluid, the valve 66 is closed. The adapter plate 32 is then disconnected from the oil reservoir 12 and the oil reservoir is sealed.

While this invention has been shown and described in terms of a particular embodiment, it will be understood that various modifications and changes may be made without departing from the actual scope of the invention.

What is claimed:

1. A method of cleaning and replenishing a hydraulic system having first and second ends, comprising the sequential steps of:
    opening the ends of the system to allow hydraulic fluid in the system to drain from the system;
    injecting an organic solvent into the system through one end of the system and out the other end of the system, said solvent being miscible with oil and water and vaporizable at low temperatures and at atmospheric pressure;
    terminating the flow of solvent and closing the first end of the system;
    applying a vacuum to the second end of the system to vaporize the solvent and remove the solvent vapor and air;
    injecting hydraulic fluid into the second end of the evacuated system to fill the system with hydraulic fluid while the vacuum is maintained on the system; and,
    closing the second end of the system.

2. The method of cleaning and replenishing a hydraulic system as defined in claim 1, wherein said hydraulic system is a vehicle brake system, said hydraulic fluid is brake fluid, and said solvent is dichlorodifluromethane.

3. The method of cleaning and replenishing a hydraulic system as defined in claim 2, wherein said organic solvent is injected into the system as a liquid under pressure.

4. A method of cleaning and replenishing a vehicle hydraulic brake system having first and second ends, comprising the sequential steps of:
    opening the ends of the system to drain hydraulic brake fluid from the system;
    injecting dichlorodifluromethane solvent into the brake system through the first end of the system and out the second end of the system;
    closing the second end of the system;
    vaporizing the solvent;
    applying a vacuum to the first end of the system to remove air and solvent vapor from the system;
    injecting hydraulic brake fluid into the first end of the system to fill the system with hydraulic brake fluid while the vacuum is maintained on the system; and,
    sealing the system.

* * * * *